(12) United States Patent
Laperriere et al.

(10) Patent No.: US 12,734,964 B2
(45) Date of Patent: Sep. 15, 2026

(54) INDICATING COMPONENT OF CAMERA MONITORING SYSTEM

(71) Applicant: Volvo Truck Corporation, Gothenburg (SE)

(72) Inventors: Renaud Laperriere, Lyons (FR); Philemon Chavrier, Lyons (FR)

(73) Assignee: Volvo Truck Corporation, Gothenburg (SE)

( * ) Notice: Subject to any disclaimer, the term of this patent is extended or adjusted under 35 U.S.C. 154(b) by 215 days.

(21) Appl. No.: 18/235,117

(22) Filed: Aug. 17, 2023

(65) Prior Publication Data

US 2024/0083361 A1 Mar. 14, 2024

(30) Foreign Application Priority Data

Sep. 12, 2022 (EP) .................................... 22195216

(51) Int. Cl.
*B60R 1/25* (2022.01)
*G06T 7/70* (2017.01)
*H04N 23/54* (2023.01)
*H04N 23/90* (2023.01)

(52) U.S. Cl.
CPC .................. *B60R 1/25* (2022.01); *G06T 7/70* (2017.01); *H04N 23/54* (2023.01); *H04N 23/90* (2023.01); *B60R 2300/105* (2013.01)

(58) Field of Classification Search
CPC ....... B60R 1/25; B60R 2300/105; B60R 1/00; B60R 2300/301; B60R 2300/8093; G06T 7/70; H04N 23/54; H04N 23/90
See application file for complete search history.

(56) References Cited

U.S. PATENT DOCUMENTS

| | | | | |
|---|---|---|---|---|
| 9,387,813 | B1 * | 7/2016 | Moeller | H04N 23/65 |
| 2017/0039782 | A1 * | 2/2017 | Moeller | G07C 5/008 |
| 2017/0124881 | A1 * | 5/2017 | Whitehead | G08G 1/167 |
| 2021/0040711 | A1 * | 2/2021 | Seki | E02F 3/434 |
| 2021/0287403 | A1 | 9/2021 | Lang et al. | |
| 2025/0022194 | A1 * | 1/2025 | Musha | B60R 1/26 |

FOREIGN PATENT DOCUMENTS

| | | | |
|---|---|---|---|
| EP | 3138736 B1 | | 7/2018 |
| JP | 2003339044 A | * | 11/2003 |

OTHER PUBLICATIONS

Extended European Search Report for European Patent Application No. 22195216.1, mailed Mar. 9, 2023, 9 pages.

* cited by examiner

*Primary Examiner* — Shadan E Haghani
(74) *Attorney, Agent, or Firm* — Sage Patent Group

(57) ABSTRACT

A method may include receiving, by a processor device of a computer system of a vehicle, image data from a camera proximate a distal end of a camera mount structure coupled to the vehicle, the image data including a captured image of a region adjacent a vertical side surface of the vehicle, the distal end of the camera mount structure protruding outwardly from the vertical side surface. The method further includes determining, by the processor device, a relative location of the distal end of the camera mount structure with respect to the vertical side surface of the vehicle within the captured image. The method further includes causing, by the processor device, a display device of the vehicle to display an image comprising the captured image and a first indication of the relative location of the distal end of the camera mount structure within the captured image.

17 Claims, 8 Drawing Sheets

138
134
118
130
D
114
124
128
102
116
112
108
120
122
109
106
110
111
132
138
115
108
136
114

INDICATING COMPONENT OF CAMERA MONITORING SYSTEM

CROSS REFERENCE TO RELATED APPLICATIONS

This application claims foreign priority to European Application No. 22195216.1 filed on Sep. 12, 2022, the disclosure and content of which is incorporated by reference herein in its entirety.

TECHNICAL FIELD

The disclosure relates generally to camera monitoring system for a vehicle. In particular aspects, the disclosure relates to indicating a component of a camera monitoring system.

The disclosure can be applied in heavy-duty vehicles, such as trucks, buses, and construction equipment. Although the disclosure may be described with respect to a particular vehicle, the disclosure is not restricted to any particular vehicle.

BACKGROUND

Many vehicles employ a camera monitoring system as a replacement for, or supplement to, conventional physical rear view and side view mirrors. One advantage of a camera monitoring system is the ability to place cameras in many different locations on and around the vehicle, thereby allowing an operator to view areas around the vehicle without a direct line of sight to a physical mirror. Unlike conventional mirrors, however, components of the camera monitoring system, such as cameras and camera mount structures, may not be visible to an operator during normal operation, and may be susceptible to collision or other damage.

SUMMARY

According to a first aspect of the disclosure, a method includes receiving, by a processor device of a computer system of a vehicle, image data from a camera proximate a distal end of a camera mount structure coupled to the vehicle, the image data including a captured image of a region adjacent a vertical side surface of the vehicle, the distal end of the camera mount structure protruding outwardly from the vertical side surface. The method further includes determining, by the processor device, a relative location of the distal end of the camera mount structure with respect to the vertical side surface of the vehicle within the captured image. The method further includes causing, by the processor device, a display device of the vehicle to display an image including the captured image and a first indication of the relative location of the distal end of the camera mount structure within the captured image. The first aspect of the disclosure may seek to of reduced visibility of the camera mount structure to an operator of the vehicle. A technical benefit may include providing an indication of a relative location of the camera mount structure to the operator to avoid collision and/or other damage during vehicle operation.

In some examples, the distal end of the camera mount structure protrudes a first distance in a horizontal direction with respect to a vertical plane corresponding to the vertical side surface. The first indication corresponds to the first distance with respect to the vertical plane within the image. A technical benefit may include providing an accurate indication of the relative horizontal position of the camera mount structure with respect to a potential obstacle indicated by the captured image for collision avoidance.

In some examples, the distal end of the camera mount structure is positioned at a first height in a vertical direction with respect to a ground plane corresponding to a ground surface. The first indication corresponds to the first height with respect to the ground plane within the image. A technical benefit may include providing an accurate indication of the relative vertical position of the camera mount structure with respect to a potential obstacle indicated by the captured image for collision avoidance.

In some examples, the first indication includes a vertical line of the relative location of the distal end of the camera mount structure within the captured image. A technical benefit may include providing a clear indication of the relative location of the camera mount structure without obscuring elements of the captured image for collision avoidance.

In some examples, the first indication includes a graphical outline corresponding to a location of the camera mount structure within the captured image. A technical benefit may include providing a clear indication of the shape and relative location of the camera mount structure without obscuring elements of the captured image for collision avoidance.

In some examples, the image further includes a second indication of a relative location of vertical side surface within the captured image. A technical benefit may include providing an additional indication to aid the operator in determining a relative location of the vehicle and camera mount structure with respect to a potential obstacle, for collision avoidance.

In some examples, the vehicle includes a truck cab, and the vertical side surface includes a side surface of the truck cab. A technical benefit may include providing an indication of a relative location of the camera mount structure to a truck cab operator, where the truck cab may obscure visibility of the camera mount structure from within the cab.

In some examples, the vehicle includes a truck cab and a trailer, and the vertical side surface includes a side surface of the trailer. A technical benefit may include providing an indication of a relative location of the camera mount structure and the verical side surface of the trailer, which may have a different width than the truck cab, to a truck cab operator, to provide visibility of the camera mount structure from within the cab.

According to a second aspect of the disclosure, a vehicle includes a cab including a driver compartment. The vehicle further includes a display device arranged to be visible to a driver in the driver compartment. The vehicle further includes a camera mount structure coupled to an exterior of the cab, a distal end of the camera mount structure protruding outwardly from the vertical side surface. The vehicle further includes a camera mounted to the camera mount structure, the camera positioned to capture an image of a region adjacent a vertical side surface of the vehicle, the vertical side surface substantially parallel to a direction of travel of the vehicle. The vehicle further includes a computer system including a processor device configured to perform a method according to the first aspect. The second aspect of the disclosure may seek to address a potential problem with visibility of a camera mount structure from a vehicle cab. A technical benefit may include apply the solution of the first aspect to a vehicle to provide an indication of a relative location of the camera mount structure to the operator of the vehicle, and to avoid collision and/or other damage to the camera mount structure.

In some examples, the camera is mounted proximate a distal end of the camera mount structure. A technical benefit may include providing an image capture device to capture the captured image for use with the first indication, for collision avoidance.

In some examples, the camera includes a first camera facing substantially rearward with respect to the direction of travel of the vehicle, and a second camera facing substantially downward with respect to the cab. A technical benefit may include providing captured images representing multiple angles and fields of view around the vehicle, for collision avoidance.

In some examples, the vertical side surface includes a side surface of the cab, and the camera mount structure is coupled to the side surface of the cab above a side window of the cab. A technical benefit may include providing an indication of a relative location of the camera mount structure to a truck cab operator, where the truck cab may obscure visibility of the camera mount structure mounted above the window and out of a direct line of sight of the operator.

In some examples, the distal end of the camera mount structure is arranged to not be visible to a driver in the driver compartment. A technical benefit may include providing an indication of a relative location of the camera mount structure to a truck cab operator, where some or all of the camera mount structure is out of a direct line of sight of the operator.

In some examples, the vehicle further includes a trailer arranged to be towed by the cab. The vertical side surface includes a side surface of the trailer.

According to a third aspect of the disclosure, a computer system for controlling a display device in a driver compartment of a vehicle is configured to perform a method according to the first aspect. The third aspect of the disclosure may seek to address a potential problem with visibility of a camera mount structure from a vehicle cab. A technical benefit may include apply the solution of the first aspect to a computer system to provide an indication of a relative location of the camera mount structure to the operator of a vehicle, and to avoid collision and/or other damage to the camera mount structure.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical effects and corresponding advantages.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

Components of the camera monitoring system, such as cameras and camera mount structures, may not be visible to an operator during normal operation, and may be susceptible to collision or other damage. To prevent damage to components of the camera monitoring system, a processor device-based computer system may determine a relative location of a distal end of a camera mount structure or other camera monitoring system component, and may cause an image to be displayed including an indication of the relative location of the distal end of the camera mount structure within a captured image captured by a camera of the camera mount structure. This and other aspects may address visibility of the camera monitoring system components to the operator by displaying the indication within the captured image, which may provide a visual indication of a location of camera monitoring system components to the operator in the cab.

Figure 1A:
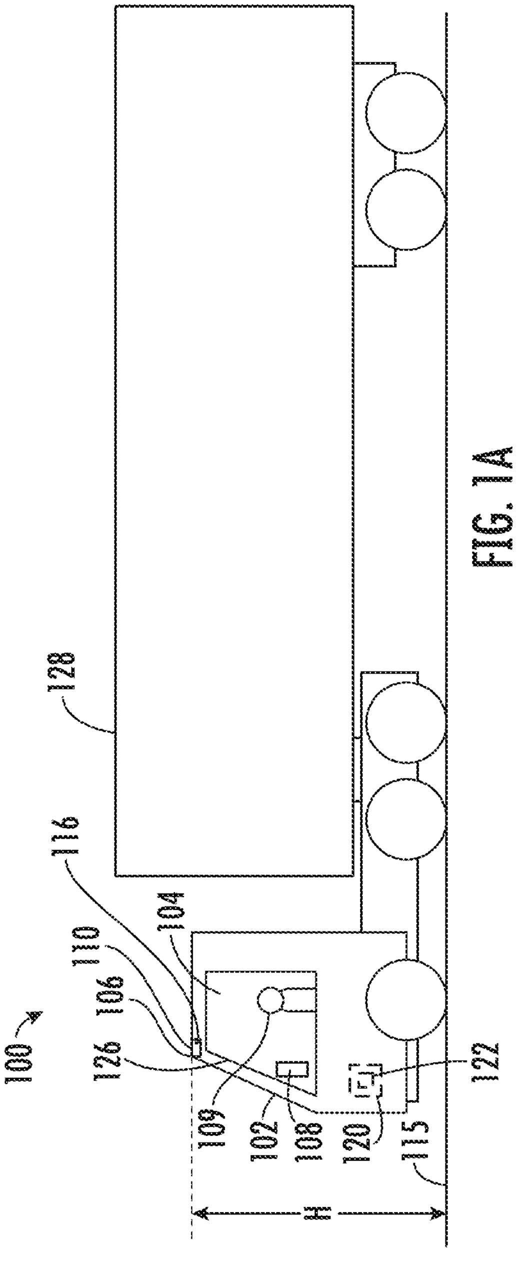
FIGS. 1A and 1B are exemplary diagrams of vehicle including a camera monitoring system according to one example.
Figure 1B:
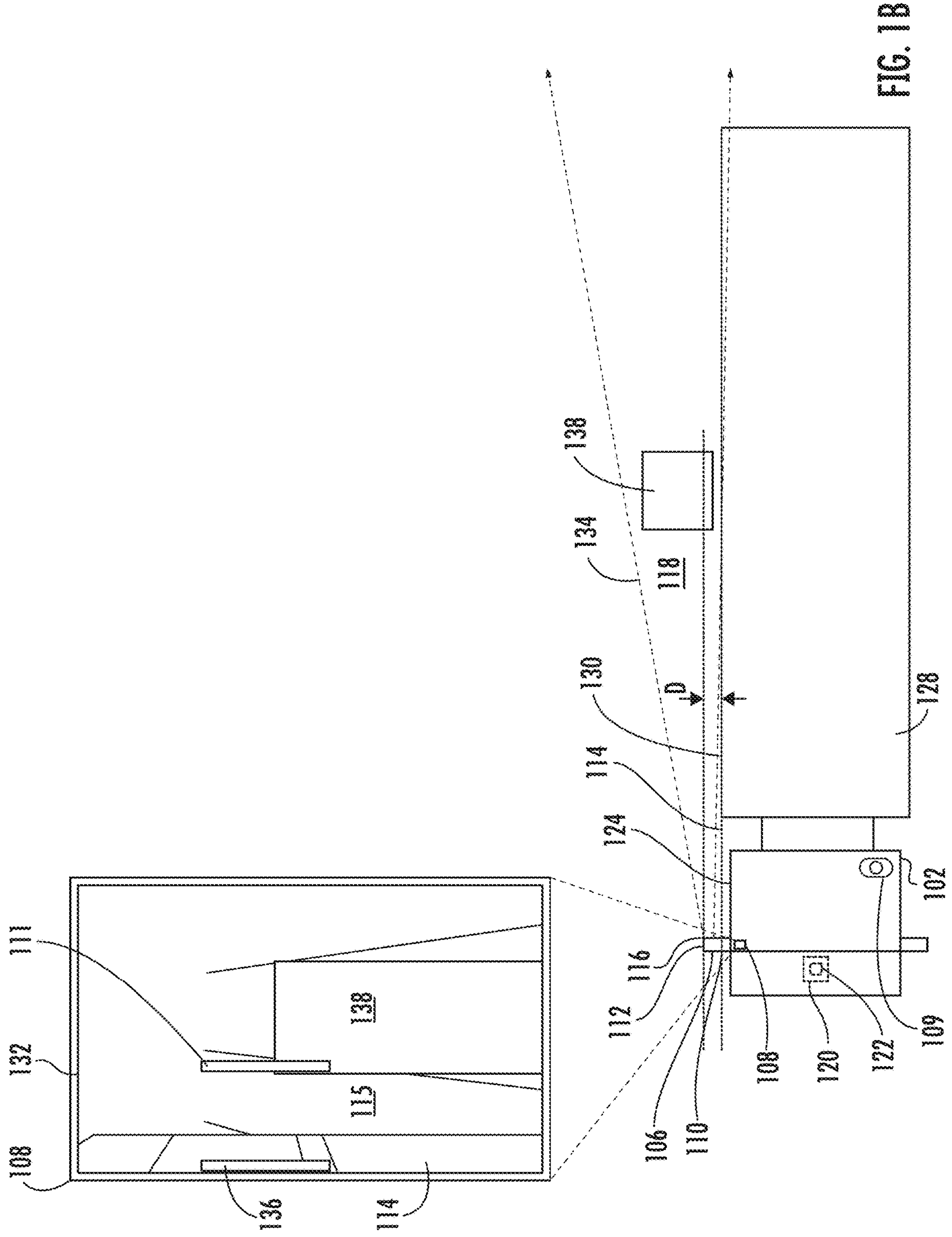

FIGS. 1A and 1B are illustrate exemplary side and top views of a vehicle 100 including a camera monitoring system 106 according to one example. The vehicle 100 (a heavy truck in this example) includes a cab 102 with a driver compartment 104. The camera monitoring system 106 includes a display device 108 (e.g., a display screen) provided within the driver compartment 104 and arranged to be visible to a driver 109 in the driver compartment 104. The camera monitoring system 106 also includes a camera mount structure 110 (e.g., wing) protruding outwardly from a vertical side surface 114 of the vehicle 100, e.g., a side surface 124 of the cab 102 in this example. In this example, the camera mount structure 110 is coupled to the side surface 124 of the cab 102 above a side window 126 of the cab 102.

A camera 116 is mounted to the camera mount structure 110, e.g., proximate a distal end 112 of the camera mount structure 110 in this example. The camera 116 is positioned to capture an image of a region 118 adjacent the vertical side surface 124 of the vehicle 100.

The camera monitoring system 106 in this example also includes a computer system 120 including a processor device 122, which will be described in greater detail below with respect to FIG. 4. As will be described in greater detail below, the processor device 122 of the computer system 120 is adapted to perform operations described herein, including the operations 300 described below with respect to FIG. 3, for example.

The vehicle 100 in this example may also include a trailer 128 coupled to and arranged to be towed by the cab 102. In some examples, the camera mount structure 110 and/or another camera mount structure may be coupled to a side surface 130 of the trailer 128, as desired.

As shown by FIG. 1B, the distal end 112 of the camera mount structure 110 protrudes a first distance D in a horizontal direction with respect to a vertical plane corresponding to the vertical side surface 114 (the side surface 130 of the trailer 128 in this example). In this example, an imaginary line 115 extends parallel to the vertical side surface 114 such that the distance between the vertical side surface 114 and the imaginary line 115 is held constant when the vehicle 100 is moving directly forward or backward.

As shown in FIG. 1B, the camera 116 has a field of view 134 of a region 118 adjacent the vertical side surface 114 of the vehicle 100. The camera 116 in this example is arranged such that the imaginary line 115 extends substantially vertically toward a vanishing point 117 on the horizon (which may or may not be within the field of view 134, while parallel lines 119 (e.g., road lines) on either side of the imaginary line 115 converge at non-vertical angles toward the vanishing point 117. This effect may be accomplished by positioning the camera 116 at a particular angle, and/or by employing a curved lens. In this manner, the field of view 134 can be defined such that any object on one side of the imaginary line 115 in the image 132 is a potential collision risk while any object on the other side of the imaginary line 115 is not a collision risk, regardless of the relative distance of the object in the direction of travel from the vehicle 100.

In this example, an obstacle 138 is in the field of view 134 of the camera 116. Referring back to FIG. 1A, the display device 108 in this example is configured to display an image 132 that includes the captured image 132 of the field of view 134 of the camera 116 (e.g., the region 118 adjacent the vertical side surface 114 of the vehicle 100, including the obstacle 138 in this example). The image 132 also includes an indication 136 of a relative location of the distal end 112 of the camera mount structure 110 within the captured image 132. The indication 136 in this example, is approximately collinear with the imaginary line 115, so that an obstacle that is not overlapped by the indication 136 is not a potential collision risk. Here, the indication 136 of the relative location of the distal end 112 of the camera mount structure 110 overlaps the obstacle 138 in the image 132, indicating that backing up the vehicle 100 risks a collision between the obstacle 138 and the camera mount structure 110.

In addition, as shown by FIG. 1A, the distal end 112 of the camera mount structure 110 is positioned at a first height H in a vertical direction with respect to a ground plane corresponding to a ground surface 113. The indication 136 corresponds to the first height H with respect to the ground plane within the image 132. In this example, the indication 136 is a vertical line of the relative location of the distal end of the camera mount structure within the captured image, which corresponds to the first distance D with respect to the vertical plane, and to the first height H with respect to the ground plane in this example. As shown in FIG. 1A, the image 132 may also include a second indication 136 of a relative location of the vertical side surface 114 (e.g., the side surface 124 of the truck cab 102 and/or the side surface 130 of the trailer 128, for example).

Figure 2:
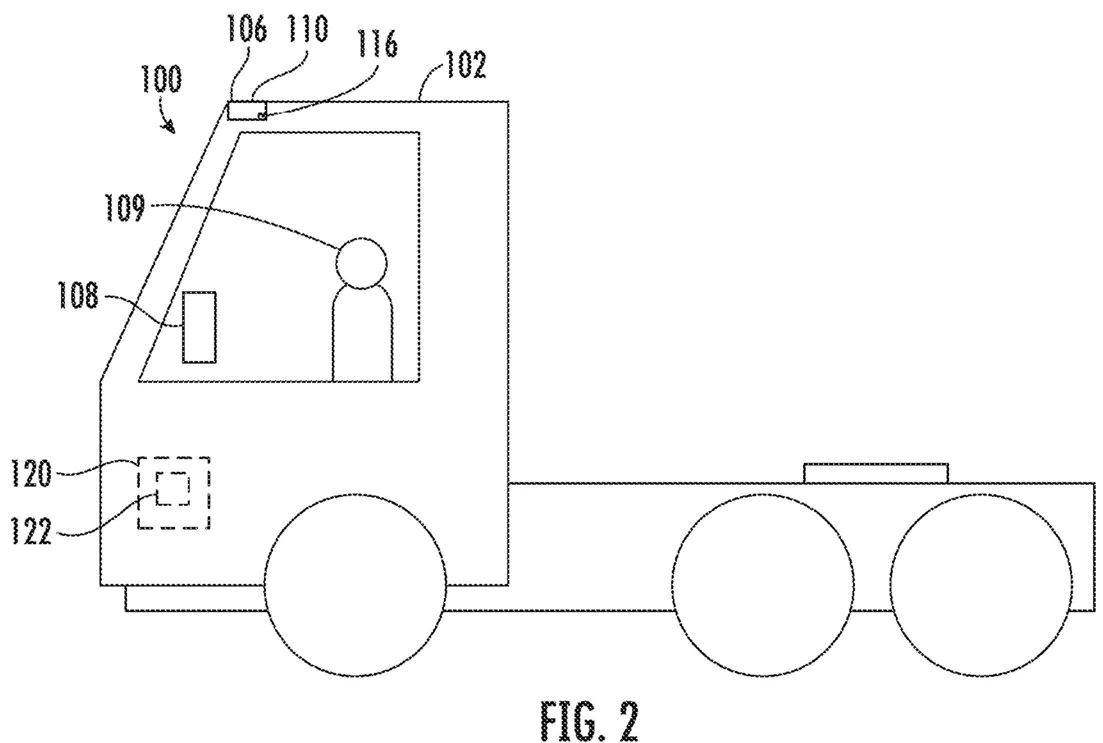
FIG. 2 is another view of FIG. 1, according to another example.

FIG. 2 is another view of FIG. 1, according to another example. In this simplified diagram, the vehicle 100 includes a cab 102 including a driver compartment 104. The vehicle 100 further includes a display device 108 arranged to be visible to a driver 109 in the driver compartment 104. The vehicle 100 further includes a camera mount structure 110 coupled to an exterior of the cab 102, a distal end 112 of the camera mount structure 110 protruding outwardly from a vertical side surface 114. The vehicle 100 further includes a camera 116 mounted to the camera mount structure 110, the camera 116 positioned to capture an image of a region 118 adjacent the vertical side surface 114 of the vehicle 100. The vehicle 100 further includes a display device 108 configured to display an image 132 including the indication 111 of the vertical side surface 114 of the vehicle. The vehicle 100 further includes a computer system 120 including a processor device 122 configured to perform operations 300 described below with respect to FIG. 3.

Figure 3:
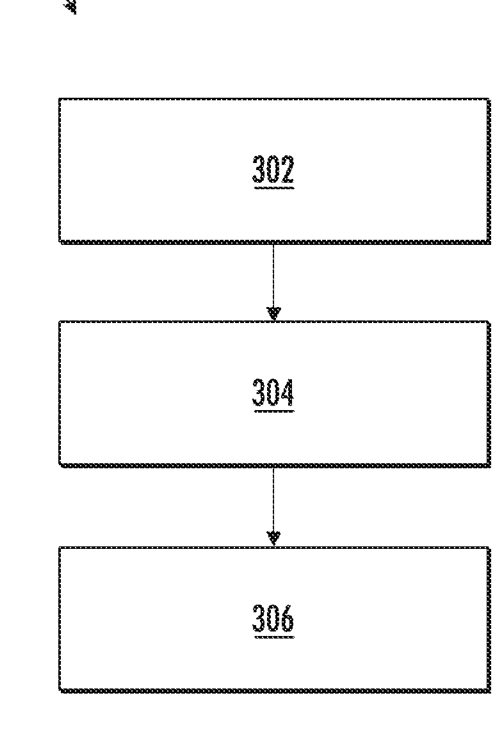
FIG. 3 is a flow chart of exemplary operations to display an indication of a relative location of a camera mount structure of the vehicle, according to one example.

In this regard, FIG. 3 is a flow chart of operations 300 to display an indication 111 of a relative location of a camera mount structure 110 of a vehicle 100 (see, e.g., FIGS. 1A-2), according to one example. The operations 300 may include receiving, by a processor device 122 of a computer system 120 of a vehicle 100 (see, e.g., FIG. 4), image data from a camera 116 proximate a distal end 112 of a camera mount structure 110 coupled to the vehicle 100, the image data comprising a captured image 132 of a region 118 adjacent a vertical side surface 114 of the vehicle 100, the distal end 112 of the camera mount structure 110 protruding outwardly from the vertical side surface 114 (Block 302).

The operations 300 of FIG. 3 further include determining, by the processor device 122, a relative location of the distal end 112 of the camera mount structure 110 with respect to the vertical side surface 114 of the vehicle 100 within the captured image 132 (Block 304).

The operations 300 of FIG. 3 may further include causing, by the processor device 122, a display device 108 of the vehicle 100 to display an image 132 comprising the captured image 132 and a first indication 111 of the relative location of the distal end 112 of the camera mount structure 110 within the captured image 132 (Block 304). Examples of the display of the captured image and indication are described in greater detail below with respect to FIGS. 7-9.

In some examples, a computer program product may include program code for performing, when executed by a processor device 402 (see FIG. 4 below), methods and operations disclosed herein, such as the operations 300 of FIG. 3, for example.

Figure 4:
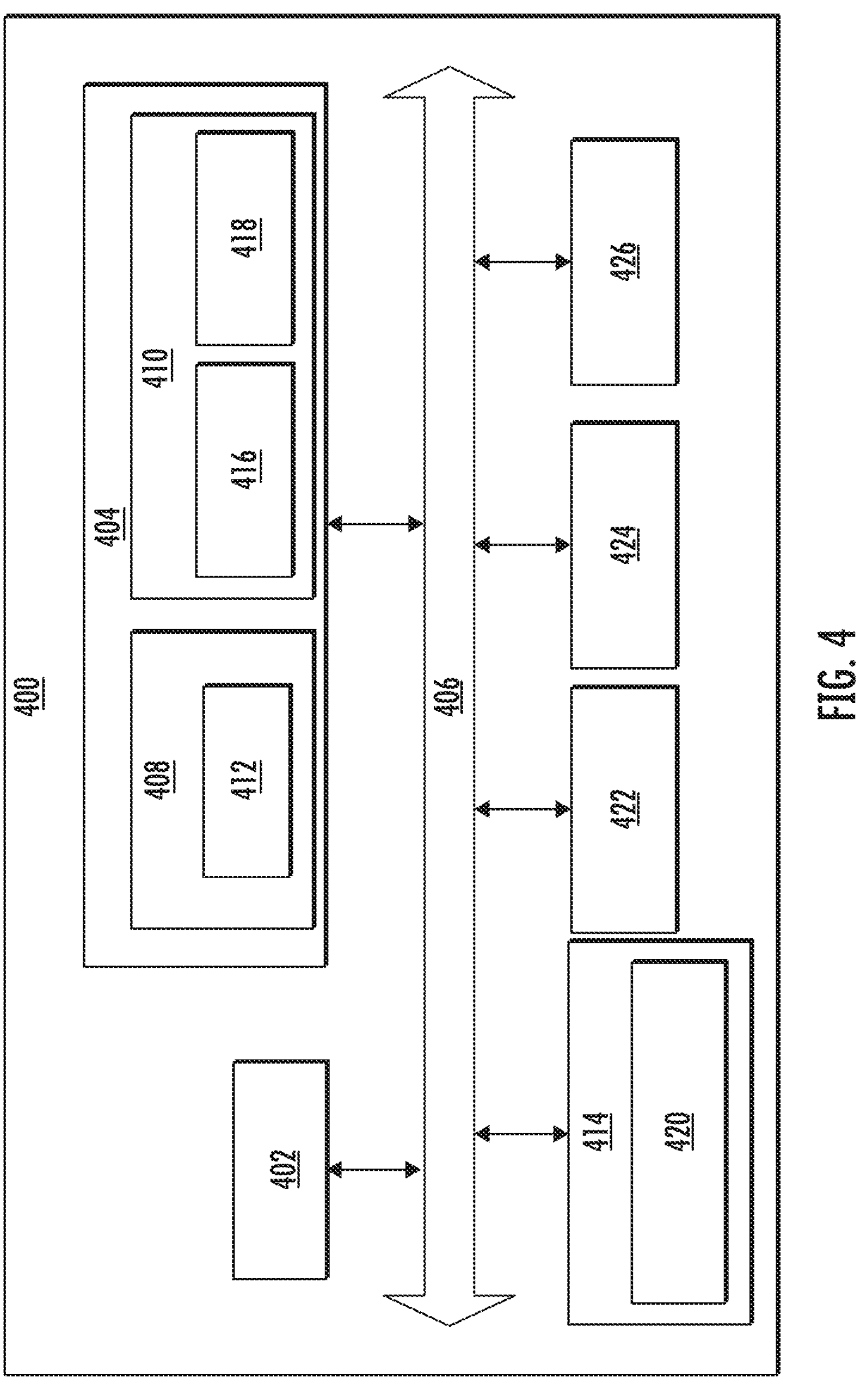
FIG. 4 is a schematic diagram of an exemplary computer system for implementing examples disclosed herein, according to one example.

In this regard, FIG. 4 is a schematic diagram of a computer system 400 for implementing examples disclosed herein. Features of the computer system 400 may be used interchangeably with, or in addition to, features of the computer system 120 of FIG. 1A above. The computer system 400 of FIG. 4 is adapted to execute instructions from a computer-readable medium to perform these and/or any of the functions or processing described herein. The computer system 400 may be connected (e.g., networked) to other machines in a LAN, an intranet, an extranet, or the Internet. While only a single device is illustrated, the computer system 400 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 400 may include at least one computer device or electronic device capable of including firmware, hardware, and/or executing software instructions to implement the functionality described herein. The computer system 400 may include a processor device 402 (may also be referred to as a control unit), a memory 404, and a system bus 406. The computer system 400 may include at least one computing device having the processor device 402. The system bus 406 provides an interface for system components including, but not limited to, the memory 404 and the processor device 402. The processor device 402 may include any number of hardware components for conducting data or signal processing or for executing computer code stored in memory 404. The processor device 402 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 406 may be any of several types of bus structures that may further interconnect to a memory bus (with or without a memory controller), a peripheral bus, and/or a local bus using any of a variety of bus architectures. The memory 404 may be one or more devices for storing data and/or computer code for completing or facilitating methods described herein. The memory 404 may include database components, object code components, script components, or other types of information structure for supporting the various activities herein. Any distributed or local memory device may be utilized with the systems and methods of this description. The memory 404 may be communicably connected to the processor device 402 (e.g., via a circuit or any other wired, wireless, or network connection) and may include computer code for executing one or more processes described herein. The memory 404 may include non-volatile memory 408 (e.g., read-only memory (ROM), erasable programmable read-only memory (EPROM), electrically erasable programmable read-only memory (EEPROM), etc.), and volatile memory 410 (e.g., random-access memory (RAM)), or any other medium which can be used to carry or store desired program code in the form of machine-executable instructions or data structures and which can be accessed by a computer or other machine with a processor device 402. A basic input/output system (BIOS) 412 may be stored in the non-volatile memory 408 and can include the basic routines that help to transfer information between elements within the computer system 400.

The computer system 400 may further include or be coupled to a non-transitory computer-readable storage medium such as the storage device 414, which may include, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 414 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 414 and/or in the volatile memory 410, which may include an operating system 416 and/or one or more program modules 418. All or a portion of the examples disclosed herein may be implemented as a computer program product 420 stored on a transitory or non-transitory computer-usable or computer-readable storage medium (e.g., single medium or multiple media), such as the storage device 414, which includes complex programming instructions (e.g., complex computer-readable program code) to cause the processor device 402 to carry out the steps described herein. Thus, the computer-readable program code can include software instructions for implementing the functionality of the examples described herein when executed by the processor device 402. The processor device 402 may serve as a controller, or control system, for the computer system 400 that is to implement the functionality described herein.

The computer system 400 also may include an input device interface 422 (e.g., input device interface and/or output device interface). The input device interface 422 may be configured to receive input and selections to be communicated to the computer system 400 when executing instructions, such as from a keyboard, mouse, touch-sensitive surface, etc. Such input devices may be connected to the processor device 402 through the input device interface 422 coupled to the system bus 406 but can be connected through other interfaces such as a parallel port, an Institute of Electrical and Electronic Engineers (IEEE) 1394 serial port, a Universal Serial Bus (USB) port, an IR interface, and the like. The computer system 400 may include an output device interface 424 configured to forward output, such as to a display, a video display unit (e.g., a liquid crystal display (LCD) or a cathode ray tube (CRT)). The computer system 400 may also include a communications interface 426 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

Figure 5A:
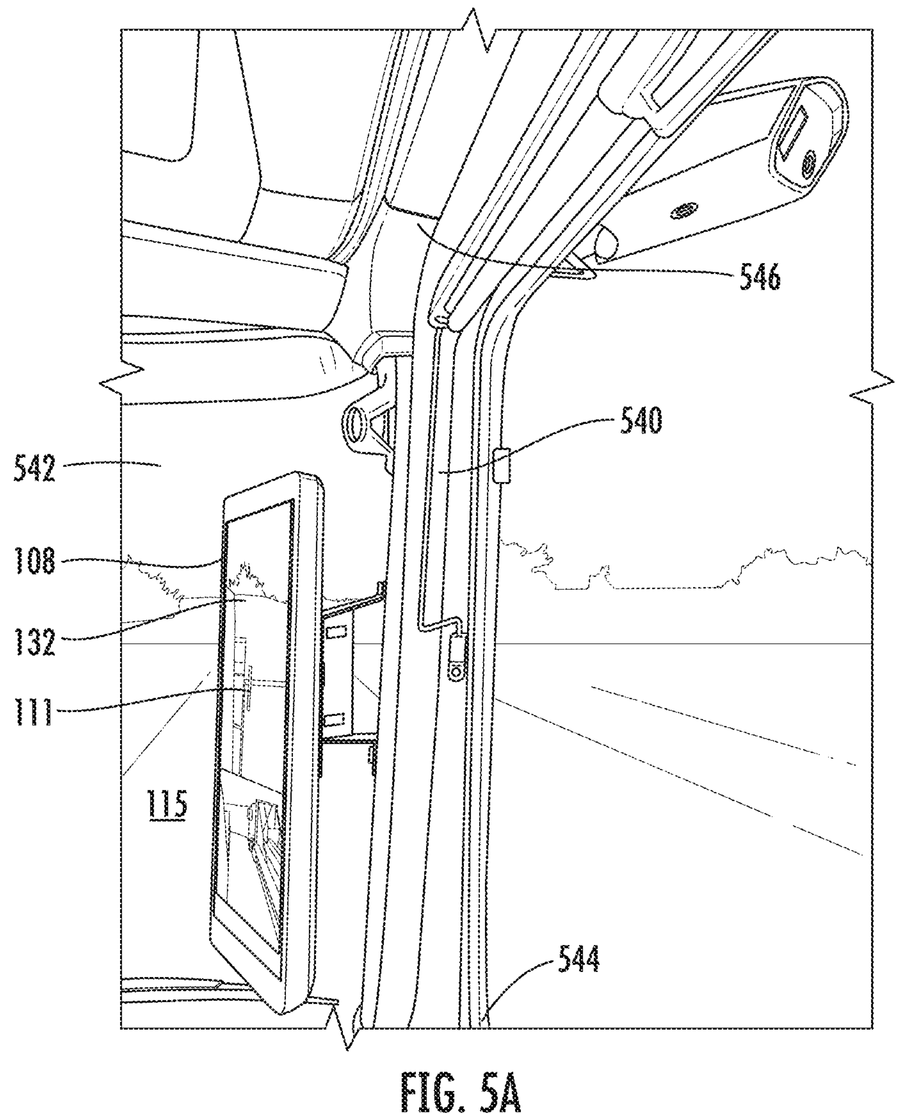
FIGS. 5A and 5B are views illustrating fields of view from within a truck cab of the vehicle of FIG. 1, according to one example.
Figure 5B:
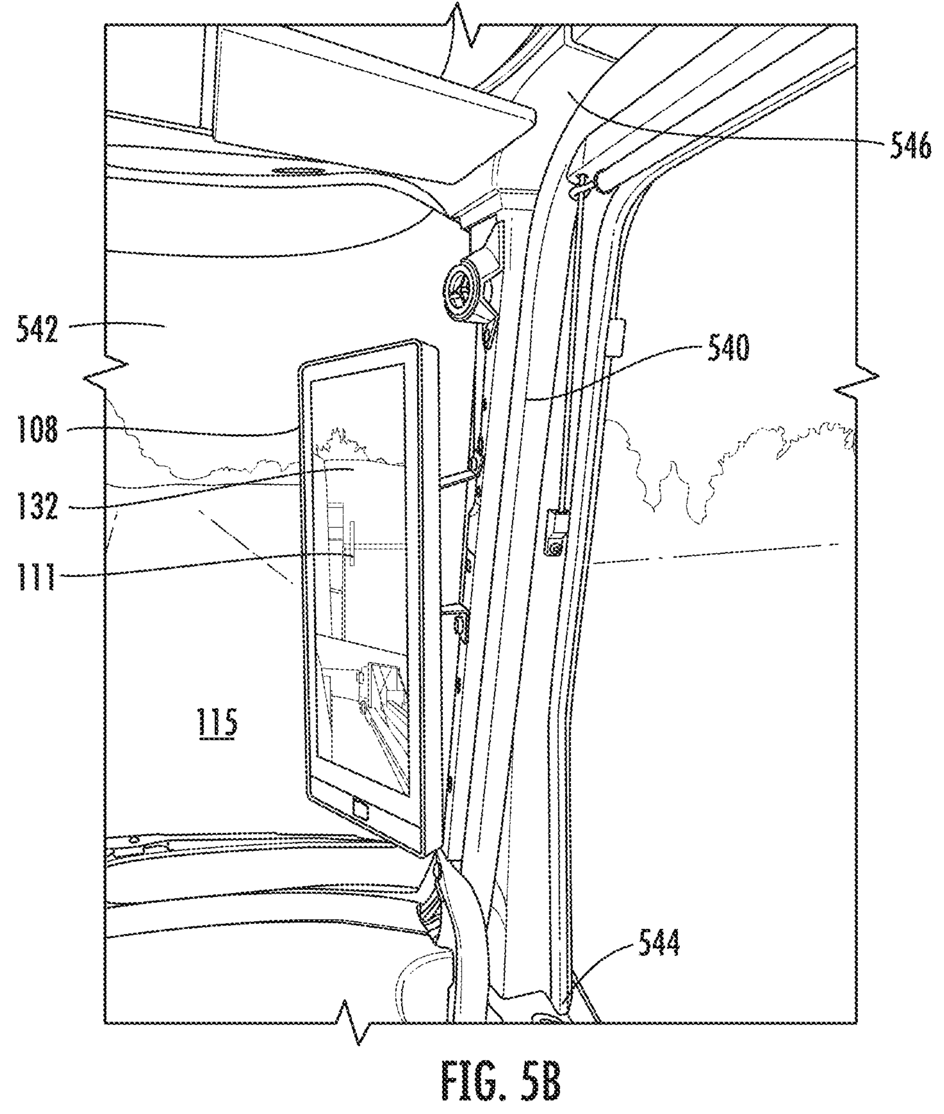

FIGS. 5A and 5B are views illustrating fields of view from within a truck cab 102 of the vehicle 100 of FIG. 1, according to one example. In this regard, FIG. 5A is a view of a driver compartment 104 of the truck cab 102 on a passenger side of the driver compartment 104. In this example, a display device 108 is mounted to an A-pillar 540 of the truck cab 102 adjacent a windshield 542 of the truck cab 102, so that the display device 108 appears in a similar location as a conventional side mirror. It should be understood, however, that the display device 108 can be positioned anywhere within or around the truck cab 102 so that the display device 108 may be within a field of view of and/or readily accessible by a driver in the driver compartment 104.

As shown by FIG. 5A, the camera mount structure 110 in this example is coupled to the cab 102 above a side window 126 of the cab 102. In some examples, a portion of the camera mount structure 110 may be visible to an occupant, e.g., a driver or passenger, in the driver compartment 104. For example, in the view of FIG. 5A, which corresponds to field of view of a passenger positioned near the passenger side door 544 and the passenger side window 126, the distal end 112 of the camera mount structure 110 may be visible to the occupant. However, as shown by FIG. 5B, which corresponds to a field of view of the occupant positioned farther away from the passenger side door 544 and the passenger side window 126, a view of the entire camera mount structure 110, including the distal end 112 of the camera mount structure 110, may be blocked by the A-pillar 540 and/or roof 546 of the truck cab 102, and may not be visible to the occupant of the driver compartment 104 from some or all vantage points. For example, while it may be possible for an occupant on one side of the truck cab 102 to see the camera mount structure 110 on the corresponding side of the truck cab 102 from certain vantage points, the occupant may be unable to see the camera mount structure 110 on the opposite side of the truck cab 102 from any vantage point, particularly vantage points corresponding to a conventional driving position for a driver of the vehicle 100.

Figure 6:
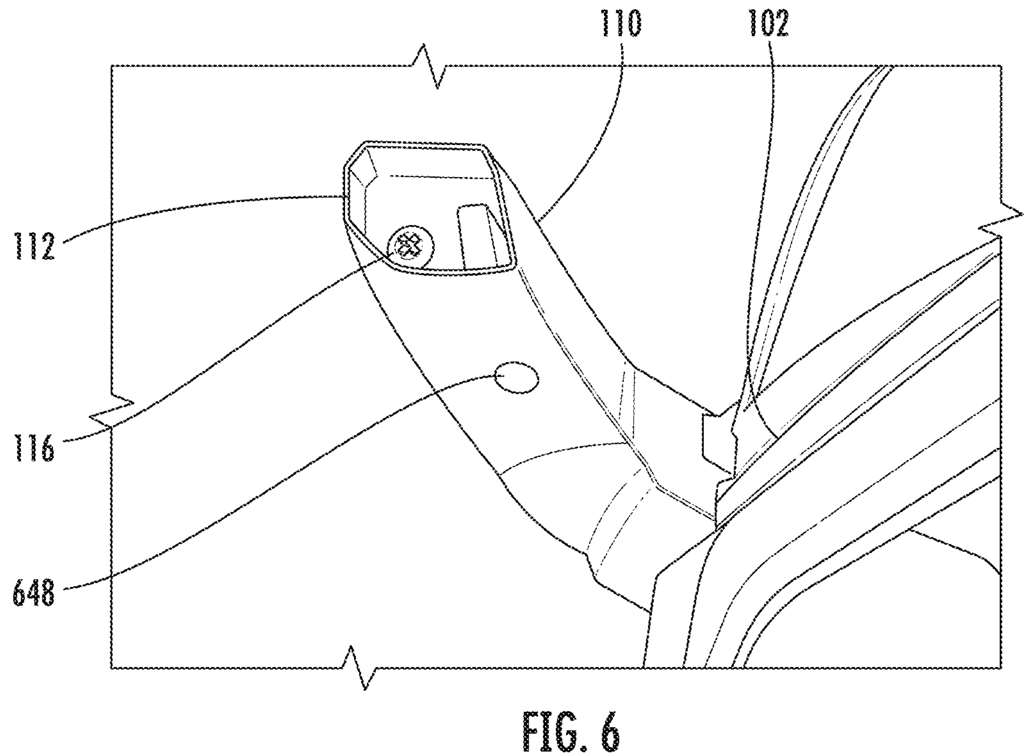
FIG. 6 is a view of a camera mount structure and camera coupled to the truck cab of FIG. 1, according to one example.

FIG. 6 is a view of a camera mount structure 110 and camera 116 coupled to the truck cab of FIG. 1, according to one example. As discussed above, the camera mount structure 110 may be coupled to a side surface 124 of the cab 102 above a side window 126 of the cab 102, such that the camera mount structure 110, including the distal end of the camera mount structure, may not be visible to an occupant of the driver compartment 104. The camera 116 in this example faces substantially rearward with respect to the direction of travel of the vehicle 100, to provide a rear-view of a region adjacent the side surface 114 of the vehicle 100. In this example, a second camera 648 is also provided, and faces substantially downward with respect to the truck cab 102, to provide a downward view of the road surface and the region adjacent the side surface 114 of truck cab 102.

Figure 7:
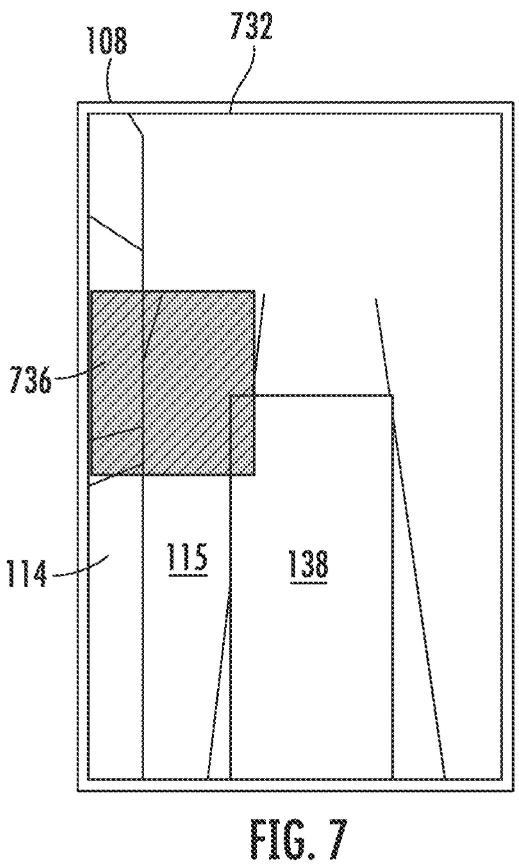
FIG. 7 is a view of display device within the truck cab of FIGS. 1A and 1B, displaying a captured image of the field of view of FIG. 7 and an indication of the relative location of a distal end of the camera mount structure, according to another example.

FIG. 7 is a view of the display device 108 within the truck cab 102 of FIGS. 1A and 1B, displaying an alternative image 732 including a captured image of the field of view 134 of the camera 116 of FIGS. 1A and 1B and an alternative indication 736 of the relative location of the distal end 112 of the camera mount structure 110 of FIGS. 1A and 1B, according to one example. In this example the indication 736 is a graphical outline corresponding to the camera mount structure 110 of a relative location of the distal end of the camera mount structure within the image 732. Here, the indication 736 of the relative location of the camera mount structure 110 overlaps the obstacle 138 in the image 732, indicating that backing up the vehicle 100 risks a collision between the obstacle 138 and the camera mount structure 110.

Additional examples and aspects of the disclosure are listed below:

According to another example, a computer system 120 may include at least one computer device (e.g., the computer system 120 or a component thereof) including a processor device 122. The processor device 122 may be configured to receive image data from a camera 116 proximate a distal end 112 of a camera mount structure 110 coupled to a vehicle 100, the image data comprising a captured image 132 of a region 118 adjacent a vertical side surface 114 of the vehicle 100, the distal end 112 of the camera mount structure 110 protruding outwardly from the vertical side surface 114. The processor device 122 may be further configured to determine a relative location of the distal end of the camera mount structure with respect to the vertical side surface 114 of the vehicle 100 within the captured image 132. The processor device 122 may be further configured to cause a display device 108 of the vehicle 100 to display an image 132 comprising the captured image 132 and a first indication 111 of the relative location of the distal end 112 of the camera mount structure 110 within the captured image 132.

According to another example, the first indication 111 corresponds to a first distance D with respect to the vertical plane within the image 132, the first distance D representative of a distance in a horizontal direction between the distal end 112 of the camera mount structure 110 with respect to a vertical plane corresponding to the vertical side surface 114.

According to another example, the first indication 111 corresponds to a first height H with respect to the ground plane within the image 132, the first height H representative of a height in a vertical direction between the distal end 112 of the camera mount structure 110 and a ground plane corresponding to a ground surface 113.

According to another example, the first indication 111 comprises a vertical line of the relative location of the distal end 112 of the camera mount structure 110 within the captured image 132.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A method comprising:

receiving, by a processor device of a computer system of a vehicle, image data from a camera proximate a distal end of a camera mount structure coupled to the vehicle, wherein the distal end of the camera mount structure is positioned at a first height in a vertical direction with respect to a ground plane corresponding to a ground surface, the image data comprising a captured image of a region adjacent a vertical side surface of the vehicle, the distal end of the camera mount structure protruding outwardly from the vertical side surface;

determining, by the processor device, a relative location of the distal end of the camera mount structure with respect to the vertical side surface of the vehicle within the captured image; and causing, by the processor device, a display device of the vehicle to display an image comprising the captured image and a first indication of the relative location of the distal end of the camera mount structure within the captured image, wherein the first indication corresponds to the first height with respect to the ground plane within the image, wherein the first indication comprises a vertical line of the relative location of the distal end of the camera mount structure within the captured image, and wherein the camera mount structure is positioned to define a field of view of the region adjacent a vertical side surface of the vehicle such that any object on one side of the vertical line in the image is a potential collision risk and such that any object on the other side of the vertical line in the image is not a collision risk, regardless of a distance of the object in the direction of travel from the vehicle.

2. The method according to claim 1, wherein the distal end of the camera mount structure protrudes a first distance in a horizontal direction with respect to a vertical plane corresponding to the vertical side surface, and wherein the first indication corresponds to the first distance with respect to the vertical plane within the image.

3. The method according to claim 1, wherein the first indication comprises a graphical outline corresponding to a location of the camera mount structure within the captured image.

4. The method according to claim 1, the image further comprising a second indication of a relative location of vertical side surface within the captured image.

5. The method according to claim 4, wherein the vehicle comprises a truck cab, and wherein the vertical side surface comprises a side surface of the truck cab.

6. The method according to claim 4, wherein the vehicle comprises a truck cab and a trailer, and wherein the vertical side surface comprises a side surface of the trailer.

7. A computer system for controlling a display device in a driver compartment of a vehicle, the computer system configured to perform the method according to claim 1.

8. A computer program product comprising program code for performing, when executed by the processor device, the method of claim 1.

9. A vehicle comprising:

a cab including a driver compartment;

a display device arranged to be visible to a driver in the driver compartment;

a camera mount structure coupled to an exterior of the cab, a distal end of the camera mount structure protruding outwardly from the vertical side surface;

a camera mounted to the camera mount structure, the camera positioned to capture an image of a region adjacent the vertical side surface of the vehicle; and a computer system comprising a processor device configured to perform the method of claim 1.

10. The vehicle according to claim 9, wherein the camera is mounted proximate a distal end of the camera mount structure.

11. The vehicle according to claim 9, the camera comprising:

a first camera facing substantially rearward with respect to the direction of travel of the vehicle; and a second camera facing substantially downward with respect to the cab.

12. The vehicle according to claim 9, wherein the vertical side surface comprises a side surface of the cab, and wherein the camera mount structure is coupled to the side surface of the cab above a side window of the cab.

13. The vehicle according to claim 12, wherein the distal end of the camera mount structure is arranged to not be visible to a driver in the driver compartment.

14. The vehicle according to claim 11, further comprising a trailer arranged to be towed by the cab, and wherein the vertical side surface comprises a side surface of the trailer.

15. A computer system, comprising:

at least one computer device comprising a processor device configured to:

receive image data from a camera proximate a distal end of a camera mount structure coupled to a vehicle, wherein the distal end of the camera mount structure is positioned at a first height in a vertical direction with respect to a ground plane corresponding to a ground surface, the image data comprising a captured image of a region adjacent a vertical side surface of the vehicle, the distal end of the camera mount structure protruding outwardly from the vertical side surface;

determine a relative location of the distal end of the camera mount structure with respect to the vertical side surface of the vehicle within the captured image; and cause a display device of the vehicle to display an image comprising the captured image and a first indication of the relative location of the distal end of the camera mount structure within the captured image, wherein the first indication corresponds to the first height with respect to the ground plane within the image, wherein the first indication comprises a vertical line of the relative location of the distal end of the camera mount structure within the captured image, and wherein the camera mount structure is positioned to define a field of view of the region adjacent a vertical side surface of the vehicle such that any object on one side of the vertical line in the image is a potential collision risk and such that any object on the other side of the vertical line in the image is not a collision risk, regardless of a distance of the object in the direction of travel from the vehicle.

16. The computer system according to claim 15, wherein the first indication corresponds to a first distance with respect to the vertical plane within the image, the first distance representative of a distance in a horizontal direction between the distal end of the camera mount structure and to a vertical plane corresponding to the vertical side surface.

17. The computer system according to claim 15, wherein the first indication comprises a vertical line of the relative location of the distal end of the camera mount structure within the captured image.

* * * * *